United States Patent [19]

Goto et al.

[11] Patent Number: 4,552,920

[45] Date of Patent: Nov. 12, 1985

[54] SOLID RESIN COMPOSITION

[75] Inventors: Jugo Goto, Kawanishi; Tsutomu Kubota, Mishima, both of Japan

[73] Assignee: Takeda Chemical Industries, Ltd., Osaka, Japan

[21] Appl. No.: 570,587

[22] Filed: Jan. 13, 1984

[30] Foreign Application Priority Data

Jan. 17, 1983 [JP] Japan .................................. 58-6257

[51] Int. Cl.⁴ ..................... C08L 29/04; C08L 67/02
[52] U.S. Cl. ...................................... 525/58; 525/438
[58] Field of Search ............................................ 525/58

[56] References Cited

U.S. PATENT DOCUMENTS

| | | | |
|---|---|---|---|
| 3,334,057 | 8/1967 | Marks | 525/58 |
| 3,542,902 | 11/1970 | Dunion | 525/58 |
| 3,571,491 | 3/1971 | Markowski | 525/58 |
| 3,887,649 | 6/1975 | Takida | 525/58 |
| 4,404,320 | 9/1983 | Goto | 525/58 |

FOREIGN PATENT DOCUMENTS 2075984A 11/1981 United Kingdom .

*Primary Examiner*—John C. Bleutge
*Assistant Examiner*—Patricia Short
*Attorney, Agent, or Firm*—Wenderoth, Lind & Ponack

[57] ABSTRACT

A solid resin composition useful for coating and bonding, which comprises a carboxyl-modified product of a hydrolyzed ethylene/vinyl acetate copolymer, a carboxyl-terminated saturated polyester resin and a solid epoxy resin with an epoxy equivalent of 80 to 400, each of the component being blended at a specified ratio.

The composition, when baked, affords tough coating films or adhesive layers with markedly improved heat and impact resistances in addition to high hardness, strong adherence and high chemical resistance.

12 Claims, No Drawings

SOLID RESIN COMPOSITION

The present invention relates to a solid resin composition which affords tough coating films or adhesive layers with markedly improved heat and impact resistances.

Particularly, the present invention is concerned with a resin composition in the form of powder or granules, which comprises a carboxyl-modified product of a hydrolyzed ethylene/vinyl acetate copolymer, a carboxyl-terminated saturated polyester resin and a solid epoxy resin with an epoxy equivalent of 80 to 400, each of the components being blended at a specified proportion.

Hitherto, an epoxy resin, which excels in physical properties such as adherence and chemical resistance, has been put in practical use as a resin for powder coatings. The resin is, however, limited in its field of application, because the resulting coating films are rather hard and brittle, and, therefore, are not satisfactory in terms of physical properties such as impact resistance, chipping resistance and heat-cycle resistance.

The present invention has an object to provide resin compositions which retain excellent physical properties as inherently possessed by an epoxy resin powder coating and yet are remarkably improved in impact resistance as compared with the epoxy resin.

On the other hand, there has been proposed a coating composition which comprises an acid-modified product of a hydrolyzed ethylene/vinyl acetate copolymer and an epoxy resin. However, the resulting film has a defect that the hardness becomes relatively low. To increase the hardness, blending with a polyester resin is also proposed, but such blended composition is poor in their mutual compatibility. Due to this the resulting film loses its toughness and becomes lower in impact resistance. The inventors have succeeded in producing a film with high hardness by using a specific polyester resin and a limited epoxy resin in addition to the acid-modified product without deteriorating toughness and high impact resistance properties, which the acid modification inherently produces.

Thus, the present invention is directed toward a solid resin composition which comprises (a) 10 to 65 parts by weight of a carboxyl-modified product of a hydroxyl-containing polymer that is obtained by hydrolyzing an ethylene/vinyl acetate copolymer, (b) 20 to 70 parts by weight of a carboxyl-terminated saturated polyester resin having not less than 30 weight % of alicyclic and/or spiro rings in the molecule, and (c) 5 to 25 parts by weight of a solid epoxy resin having not less than two epoxy groups and an epoxy equivalent of 80 to 400, the sum of the components (a), (b) and (c) being 100 parts by weight.

Examples of the carboxyl-modified product (a) include a carboxyl-containing product prepared by a carboxyl-modification reaction of hydroxyl-containing polymers obtained by hydrolyzing ethylene/vinyl acetate copolymers through (1) the grafting of a carboxyl-containing vinyl monomer such as acrylic acid, methacrylic acid and maleic acid and (2) the addition of an aliphatic, alicyclic or aromatic acid anhydride such as succinic anhydride, maleic anhydride, fumaric anhydride, citraconic anhydride, itaconic anhydride, endeic anhydride, methylendeic anhydride, chlorendic anhydride, phthalic anhydride, hexahydrophthalic anhydride, tetrahydrophthalic anhydride, methylhexahydrophthalic anhydride and methyltetrahydrophthalic anhydride. Use can be made of a carboxyl-modified product having an acid number of 10 to 150, preferably 20 to 100. Ethylene/vinyl acetate copolymers, the raw material for said modified products, are per se known copolymers which can be, for example, produced by the high pressure process, and use is made of those with a vinyl acetate content of 20 to 50 weight %, preferably 25 to 45% by weight. In order to hydrolyze the copolymers, the reaction can be carried out in a system consisting of low boiling alcohols such as methanol, ethanol and propanol and alkali catalysts such as sodium methylate and sodium hydroxide. The hydrolysis may be conducted in the presence of organic solvents such as benzene, toluene and xylene. In the present invention use is made of hydrolyzed polymers with a hydrolysis degree of about 40 to 100%, preferably 70 to 97%.

The hydroxyl-containing polymers obtained are subsequently subjected to a carboxyl-modification reaction. As described before, the carboxyl-modification reaction involves the reaction of a hydroxyl-containing polymer, for example, with a carboxyl-containing vinyl monomer and/or the reaction of the same with an acid anhydride. In the case of the grafting of a carboxyl-containing vinyl monomer, the reaction is normally carried out by adding a radical-generating substance in the presence or absence of a suitable solvent (for example, aliphatic hydrocarbons such as hexane and heptane, alicyclic hydrocarbons such as cyclohexane, aromatic hydrocarbons such as benzene, toluene and xylene, halogenated hydrocarbons such as carbon tetrachloride, trichlene, perchlene and chlorobenzene, and other solvents such as butanol, methyl ethyl ketone, methyl isobutyl ketone, dioxane and cyclohexanone), followed by heating. The term "radical generating substance" used herein denotes materials capable of generating radicals easily through decomposition at the temperature of performing graft polymerization, and examples of such substance include organic peroxides such as benzoyl peroxide, lauroyl peroxide and dicumoyl peroxide and nitrogen-containing compounds such as $\alpha,\alpha'$-azobisisobutylonitrile. These radical-generating substances are used in the amount of about 0.05 to 3 weight % based on the hydroxyl-containing polymer, preferably about 0.1 to 1 weight %. In the reaction, the heating temperature, varying with the type of carboxyl-containing unsaturated monomers and kind of solvents to be used, cannot be precisely defined, but ranges from about 50° to 150° C., and the heating time is about 0.1 to 5 hours. In the case of the reaction with the acid anhydride, the reaction is carried out in the presence or absence of a suitable solvent by heating at about 50° to 150° C. for about 0.1 to 5 hours. In the reaction, the acid anhydride is supposed to undergo ring-opening together with OH groups of hydrolysed products to form

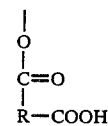

In the above processes, the modification ratio of hydroxyl-containing polymers can be found by the measurement of acid value of the products.

As the saturated polyester resin (b) usable in the present invention, there may be mentioned a saturated polyester resin having not less than two carboxyl groups a molecular weight of, 500 to 10,000 (by vapor-pressure osmometer), an acid value of 10 to 200 preferably 20 to 150, and a melting point of 40° to 200° C., preferably 60° to 150° C. Although the polyester resin can be produced by the conventional process using polyhydric alcohols and polybasic acids, use is made, in the present invention, of a dihydric alcohol having an alicyclic or spiro ring such as 1,4-cyclohexanedimethanol, 1,4-cyclohexanediol, hydrogenated bisphenol A, hydrogenated bisphenol F and spiroglycol(3,9-bis(1,1-bismethyl-2-oxyethyl)-2,4,8,10-tetraoxa spiro[5,5]undecane), and a dicarboxylic acid (or its anhydride) having an alicyclic ring such as tetrahydrophthalic acid, methyltetrahydrophthalic acid, hexahydrophthalic acid and methylhexahydrophthalic acid. The alicyclic ring as defined herein includes the cyclohexane ring and cyclohexene ring. The dihydric alcohol and dicarboxylic acid may be used in such proportion that the content of alicyclic and/or spiro rings in the polyester molecule is at least 30 weight %, preferably more than 45 weight %. Use can optionally be made of commonly used components such as polybasic acids (or their anhydrides) exemplified by maleic acid, fumaric acid, succinic acid and adipic acid, and polyhydric alcohols exemplified by ethylene glycol, propylene glycol, butylene glycol, hexylene glycol, neopentyl glycol, glycerol, trimethylolpropane and neopentyl glycol ester of hydroxypivalic acid, in an amount that does not cause the content of alicyclic and spiro rings to go beyond the above-defined value. It is recommended to use a trihydric alcohol such as trimethylol propane, because this increases the number of cuntional groups of the component (b). In addition, use can be made of raw materials having aromatic rings such as phthalic acid or its anhydride, terephthalic acid, isophthalic acid, trimellitic anhydride and bisphenol A, but when the content of these aromatic rings exceeds 20 weight %, the resultant polyester (b) becomes less compatible with the carboxyl-modified product (a), which is unfavorable in that deterioration of physical properties of the resultant coating film such as impact resistance and heat resistance is brought about.

The epoxy resin (c) usable in the present invention is a solid one having an epoxy equivalent of 80 to 400, and examples of such epoxy resins include triglycidyl isocyanurate (an epoxy equivalent of 99 and a melting point of 95° to 105° C.), diglycidyl terephthalate (an epoxy equivalent of 139 and a melting point of 102° to 106° C.), diglycidyl ether of bisphenol S (an epoxy equivalent of 181 and a melting point of 161° to 165° C.), or those of the general formula:

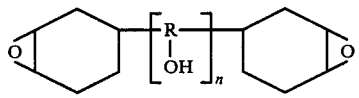

wherein R is

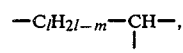

(where l is an integer of 2 to 40; m is 0, 1 or 2), and n is an integer of 1 to 10, having an epoxy equivalent of 350 to 400 and a melting point of 70° to 100° C. [Bakelite ® cycloaliphatic Epoxide ERRA-4211; Union Carbide Corp.]. Out of these epoxy resins, the resins having a melting point of about 40° to 200° C. are particularly preferable. In addition to these epoxy resins as defined herein, a variety of conventionally used epoxy resins can be employed to such an extent as may not disturb the object of the present invention.

The composition of the present invention contains the three components (a), (b) and (c) as defined above, in the proportion of 10 to 65 parts by weight for (a), 20 to 70 parts by weight for (b) and 5 to 25 parts by weight for (c), wherein the sum of these three components is equal to 100 parts by weight. When the component (a) is used in less than 10 parts by weight, there results a coating film with inferior impact resistance, and when used in excess of 65 parts by weight, a softish coating film with inferior heat resistance is formed. When the component (b) is employed in less than 20 parts by weight, there results a lowering of hardness and poor heat resistance of the produced coating film, and when used in more than 70 parts by weight, a coating film with inferior impact resistance is produced. The component (c), when used in less than 5 parts by weight, provides a coating film not only with poor heat resistance but also inferior adhesion, and when used in more than 25 parts by weight, it has poor compatibility with the component (a) or (b), resulting in the formation of a coating film with reduced impact resistance and inferior heat resistance. When the hardness, heat resistance and impact resistance are taken into close consideration, the composition wherein the component (a) is in the range of 35 to 55 parts by weight, the component (b) is in the range of 30 to 50 parts by weight and the component (c) is in the range of 8 to 18 parts by weight (the sum of the components is equal to 100 parts by weight) is particularly preferred.

In the composition of the present invention the value obtained by dividing the number of epoxy groups of the component (c) by the sum of the number of carboxyl groups of each of the components (a) and (b) should be in the range from 0.5 to 2, preferably 0.8 to 1.2, in order to afford tough coating films or layers that excel in heat resistance, impact resistance and adhesion.

The composition of the present invention can allow incorporation of catalysts, fillers, levelling agents, defoaming agents, surfactants, antiblocking agents, antioxidants, pigments, dyestuffs, etc., as occasion demands.

For the preparation of the resin composition of the present invention use can be made of the per se known methods. For example, a mixture of the components (a), (b) and (c), to which various additives are, if necessary, added, is melt-blended in an extruder. The blended mixture can be pulverized by a crusher or through a cryogenic pulverizing system to obtain a powdery resin composition. The composition may be kneaded on heated rolls and then crushed. Alternately, after each of the components is dissolved or suspended in a solvent, the solution(s) or suspension(s) may be mixed together and spray-dried or lyophilized to obtain powder. After pulverizing each of the components separately, the powdery components can be mixed together to obtain a powdery composition. The powdery composition having a particle size of 5 to 500 microns is normally employable. The resin composition of the present invention can also be used in the form of granules or pellets. The granules or pellets can be manufactured by a granulator or an extruder, and those with a granule or pellet size ranging normally from 1 mm to 10 mm are employable.

The composition of the present invention can be applied on the surface of an object to be coated or bonded in the conventionally known manners. Practical application can be conducted, for example, with the use of an electrostatic powder coating machine, electric-field curtain type powder coating machine, hot-melt applicator, transfer molding machine, etc. The coating film can also be obtained with the use of a fluidized dipping method or a flame spraying method.

After the composition is applied to the object, curing is conducted by heating in a baking furnace to produce a coating film or layer. The baking and curing temperatures for the composition vary depending upon the use of a catalyst or not, but normally range from 130° to 220° C., which are temperatures of the surface to be coated, and the time being in the range of 10 to 120 minutes. When baking is conducted at higher temperatures, the baking time can be shortened.

The solid resin composition of the present invention is of value for covering or bonding various materials such as metal, glass, concrete, ceramics and tiles.

The composition of the present invention provides a coating film possessing excellent heat resistance and impact resistance in addition to good physical characteristics in terms of hardness, adhesion, chemical resistance and water resistance. It therefore especially suitable as antichipping paints for automobile uses, coatings for guardrails, outdoor playing equipment, fences, etc., coating for preventing bursting of glass bottles for soft drinks, resin linings for corrosion protection of iron pipes, etc. or coating for rust protection of iron frames, and furthermore as a sealing and sticking agent, dipping agent, etc. for electrical parts.

The examples are describes below to illustrate the present invention.

EXAMPLE I

In 200 g of xylene was dissolved 100 g of a hydroxyl-containing polymer (a saponification degree 90% and a melt index (g/10 min:MI) 200) obtained by hydrolyzing an ethylene/vinyl acetate copolymer [a vinyl acetate content 28 weight % and MI 400], and after 10.0 g of hexahydrophthalic anhydride was added to the solution, the reaction was allowed to proceed at 100° to 105° C. for 60 minutes. Subsequently, 500 g of methanol was added to the reaction solution to allow the reaction product to separate out, and the precipitate was recovered by filtration, followed by drying under reduced pressure to obtain a carboxyl-modified product (MI 150 and an acid value 28.8). To 100 g of the modified product were added 80 g of a polyester resin (m.p. 110° to 115° C., and an acid value 66.0) having carboxyl groups at its terminals (which was obtained by the reaction of 15 moles of hydrogenated bisphenol A, 1 mole of trimethylolpropane and 21 moles of hexahydrophthalic anhydride) and 20 g of triglycidyl isocyanurate, and after they were melt-blended, the blended mixture was pulverized using a cryogenic pulverizing system to give a powdery composition. The powdery resin composition was electrostatically coated on an iron plate, and cured in a baking furnace at 200° C. for 20 minutes.

Physical properties of the resulting coating film are shown in Table 1.

EXAMPLE II

Following the same procedure as in Example I except that 20 g of triglycidyl isocyanurate was replaced with 20 g of diglycidyl terephthalate, a powdery resin composition was obtained and applied on an iron plate. Physical properties of the coating film are shown in Table 1.

EXAMPLE III

Following the same procedure as in Example I except that 80 g of the polyester resin and 20 g of triglycidyl isocyanurate were replaced with 75 g of the same resin and 25 g of diglycidyl ether of bisphenol S, respectively, a powdery resin composition was obtained and applied on an iron plate. Physical properties are shown in Table 1.

EXAMPLE IV

To 100 g of the carboxyl-modified product as used in Example I were added 80 g of a polyester resin (m.p. 95° to 100° C. and an acid value 80.1) having carboxyl groups at its terminals (which was obtained by the reaction of 4 moles of spiroglycol, 2 moles of hydrogenated bisphenol A, 1 mole of trimethylolpropane and 10 moles of methylhexahydrophthalic anhydride) and 20 g of triglycidyl isocyanurate, and after they were melt-blended, the blended mixture was pulverized using a cryogenic pulverizing system to give a powdery resin composition. The composition was electrostatically applied on an iron plate and cured in a baking furnace at 200° C. for 20 minutes.

Physical properties of the resulting coating film are shown in Table 1.

EXAMPLE V

By the same procedure as in Example I, 12.5 g of phthalic anhydride was reacted with 100 g of the hydroxyl-containing polymer (a saponification degree 90% and MI 200) of Example I to give a carboxyl-modified product (MI 130 and an acid value 34.1). To 100 g of the carboxyl-modified product were added 90 g of the polyester resin as used in Example I and 25 g of triglycidyl isocyanurate, and after they were melt-blended, the blended mixture was pulverized using a cryogenic pulverizing system to give a powdery resin composition. The composition was electrostatically applied on an iron plate, and cured in a baking furnace at 200° C. for 20 minutes.

Physical properties of the resulting coating film are shown in Table 1.

EXAMPLE VI

A 4.2 g portion of acrylic acid was grafted to 100 g of a hydroxyl-containing polymer (a saponification degree 70%) obtained by hydrolyzing an ethylene/vinyl acetate copolymer (a vinyl acetate content 28 weight % and MI 150) to give a carboxyl-modified product (MI 65 and an acid value 29). To 100 g of the carboxyl-modified product were added 80 g of the polyester resin as used in Example I and 20 g of triglycidyl isocyanurate, and after they were melt-blended, the blended mixture was pulverized using a cryogenic pulverizing system to give a powdery composition. The composition was electrostatically applied on an iron plate, and cured in a baking furnace at 200° C. for 20 minutes.

Physical properties of the resulting coating film are shown in Table 1.

TABLE 1

| | I | II | III | IV | V | VI |
|---|---|---|---|---|---|---|
| $R{-}\overset{\triangle}{O}{-}/COOH$ | 1.39 | 0.99 | 0.99 | 1.22 | 1.52 | 1.39 |
| Pencil hardness | 2B | 2B | 2B | 2B | B | 2B |
| Cross-cut adhesion test | 100/100 | 100/100 | 100/100 | 100/100 | 100/100 | 100/100 |
| Impact test ½", 1 kg | 50 cm passed | 50 cm passed | 50 cm passed | 50 cm passed | 50 cm passed | 50 cm passed |
| Flexural property | 2 mm passed | 2 mm passed | 2 mm passed | 2 mm passed | 2 mm passed | 2 mm passed |
| Erichsen | 8 mm passed | 8 mm passed | 8 mm passed | 8 mm passed | 8 mm passed | 8 mm passed |
| Ethyl acetate spot test | No change | No change | No change | No change | No change | No change |
| Weather-O-Meter (1000 hrs) | " | " | " | " | " | " |
| Water resistance test (boiled water, 2 hrs) | " | " | " | " | " | " |
| Salt-water spraying (5%, 14 days) | " | " | " | " | " | " |
| Heat resistance*: | | | | | | |
| Glass transition point, °C | 65 | 62 | 68 | 65 | 71 | 63 |
| Dynamic modulus, (dyne/cm²) 100° C. | $7.4 \times 10^7$ | $7.0 \times 10^7$ | $8.1 \times 10^7$ | $7.4 \times 10^7$ | $8.5 \times 10^7$ | $7.3 \times 10^7$ |
| 150° C. | $7.4 \times 10^7$ | $6.8 \times 10^7$ | $7.9 \times 10^7$ | $7.3 \times 10^7$ | $8.4 \times 10^7$ | $7.2 \times 10^7$ |

Note:
Dynamic viscoelasticity was measured on Viscoelastic Spectro Meter VES-F (Iwamoto Seisakusho Co. Japan)

EXAMPLE VII

By the same procedure as in Example I, 10.0 g of hexahydrophthalic anhydride was reacted with 100 g of a hydroxyl-containing polymer (a saponification degree 50% and MI 10) obtained by hydrolyzing an ethylene/vinyl acetate copolymer (a vinyl acetate content 45 weight % and MI 210) to give a carboxyl-modified product. To 100 g of the modified product (MI 75 and an acid value 28.0) were added 80 g of the polyester resin as used in Example I and 20 g of triglycidyl isocyanurate, and after they were melt-blended, the blended mixture was pulverized using a cryogenic pulverizing system to give a powdery composition. The composition was electrostatically applied on an iron plate and cured in a baking furnace at 200° C. for 20 minutes.

Physical properties of the resulting coating film are shown in Table 2.

EXAMPLE VIII

By the same procedure as in Example I, 26.0 g of hexahydrophthalic anhydride was reacted with 100 g of a hydroxyl-containing polymer (a saponification degree 90% and MI 200) obtained by hydrolyzing an ethylene/vinyl acetate copolymer (a vinyl acetate content 28 weight % and MI 400) to give a carboxyl-modified product. To 100 g of the modified product (MI 106 and an acid value 70.9) were added 70 g of the polyester resin (as used in Example I) and 25 g of triglycidyl isocyanurate, and after they were melt-blended, the blended mixture was pulverized using a cryogenic pulverizing system to give a powdery composition. The composition was electrostatically applied on an iron plate and cured in a baking furnace at 200° C. for 20 minutes.

Physical properties of the resulting coating film are shown in Table 2.

EXAMPLE IX

By the same procedure as in Example I, 10.0 g of hexahydrophthalic anhydride was reacted with 100 g of a resin produced by grafting 0.5 weight % of acrylic acid to a hydroxyl-containing polymer (a saponification degree 90% and MI 200) obtained by hydrolysis of an ethylene/vinyl acetate copolymer (a vinyl acetate content 28 weight % and MI 400) to give a carboxyl-modified product (MI 140 and an acid value 32.1). To 100 g of the modified product were added 80 g of the polyester resin as used in Example I and 20 g of triglycidyl isocyanurate, and after they were melt-blended, the blended mixture was pulverized using a cryogenic pulverizing system to give a powdery composition. The composition was electrostatically applied on an iron plate, and cured in a baking furnace at 200° C. for 20 minutes.

Physical properties of the resultant coating film are shown in Table 2.

TABLE 2

| | VII | VIII | IX |
|---|---|---|---|
| $R{-}\overset{\triangle}{O}{-}/COOH$ | 1.40 | 1.21 | 1.33 |
| Pencil hardness | 2B | 2B | 2B |
| Cross-cut adhesion test | 100/100 | 100/100 | 100/100 |
| Impact test, ½", 1 Kg | 50 cm passed | 50 cm passed | 50 cm passed |
| Flexural property | 2 mm passed | 2 mm passed | 2 mm passed |
| Erichsen | 8 mm passed | 8 mm passed | 8 mm passed |
| Ethyl acetate spot test | No change | No change | No change |
| Weather-O-Meter (1000 hrs) | " | " | " |
| Water resistance test (boiled water, 2 hrs) | " | " | " |
| Salt water spraying (5%, 14 days) | " | " | " |
| Heat resistance: | | | |
| Glass transition point, °C | 64 | 70 | 66 |
| Dynamic modulus (dyne/cm²), 100° C. | $7.4 \times 10^7$ | $8.3 \times 10^7$ | $7.6 \times 10^7$ |
| 150° C. | $7.3 \times 10^7$ | $8.1 \times 10^7$ | $7.5 \times 10^7$ |

EXAMPLE X 100 g of a carboxyl-modified product as used in Example I was melt blended with 70 g of a saturated polyester resin having carboxyl groups at the terminals (m.p. 100° to 105° C., an acid value 52.8; obtained by reacting 6 moles of hydrogenated bisphenol A with 7 moles of succinic acid anhydride) and 49 g of Bakelite ®, cycloaliphatic epoxide ERRA-4211 (m.p. 70° to 77° C., an epoxy equivalent 380; manufactured and marketed by UCC) using an extruder, thereby to give granular pellets with a length of 3 mm. This pelletized composition is particularly useful for sealing electric motor coils, motor wire connections, condensers and integrated circuits.

We claim:

1. A solid resin composition which comprises
   (a) 10 to 65 parts by weight of a carboxyl-modified product of a hydroxyl-containing polymer that is obtained by hydrolyzing an ethylene/vinyl acetate copolymer,
   (b) 20 to 70 parts by weight of a carboxyl-terminated saturated polyester resin with not less than 30 weight % of alicyclic and/or spiro rings in the molecule, selected from the group consisting of (1) a reaction product of hydrogenated bisphenol A, trimethylolpropane and hexahydrophthalic anhydride, (2) a reaction product of spiroglycol, hydrogenated bisphenol A, trimethylolpropane and methylhexahydrophthalic anhydride, and (3) a reaction product of hydrogenated bisphenol A and succinic anhydride, and
   (c) 5 to 25 parts by weight of a solid epoxy resin having two or more epoxy groups in the molecule and an epoxy equivalent of 80 to 400, selected from the group consisting of triglycidyl isocyanurate, diglycidyl terephthalate, diglycidyl ether of bisphenol S, and an epoxy resin of the formula:

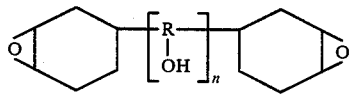

wherein R is

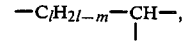

$l$ is an integer of 2 to 40, m is 0, 1 or 2, and n is an integer of 1 to 10,
the sum of the components (a), (b) and (c) being 100 parts by weight.

2. A solid resin composition according to claim 1, wherein the component (a) is in the range of 35 to 55 parts by weight, the component (b) is in the range of 30 to 50 parts by weight and the component (c) is in the range of 8 to 18 parts by weight, the sum of the components (a), (b) and (c) being 100 parts by weight.

3. A solid resin composition according to claim 1, wherein the value obtained by dividing the number of epoxy groups of the component (c) by the sum of the number of carboxyl groups of each of the components (a) and (b) is in the range from 0.5 to 2.

4. A solid resin composition according to claim 1, wherein the vinyl acetate content of the ethylene/vinyl acetate copolymer is from 20 to 50% by weight.

5. A solid resin composition according to claim 1, wherein the component (a) has an acid value of 10 to 150.

6. A solid resin composition according to claim 1, wherein the component (b) has a molecular weight of 500 to 10,000 and an acid value of 10 to 200.

7. A solid resin composition according to claim 1, wherein the component (b) is a carboxyl-terminated saturated polyester resin prepared by the reaction of hydrogenated bisphenol A, trimethylolpropane and hexahydrophthalic anhydride.

8. A solid resin composition according to claim 1, wherein the component (b) is a carboxyl-terminated saturated polyester resin prepared by the reaction of spiroglycol, hydrogenated bisphenol A, trimethylolpropane and methylhexahydrophthalic anhydride.

9. A solid resin composition according to claim 1, wherein the component (b) is a carboxyl-terminated saturated polyester resin prepared by the reaction of hydrogenated bisphenol A and succinic anhydride.

10. A solid resin composition according to claim 1, wherein the component (c) is triglycidyl isocyanurate.

11. A solid resin composition according to claim 1, wherein the component (c) is diglycidyl terephthalate.

12. A solid resin composition according to claim 1, wherein the component (c) is diglycidyl ether of bisphenol S.

* * * * *